Figure 6:
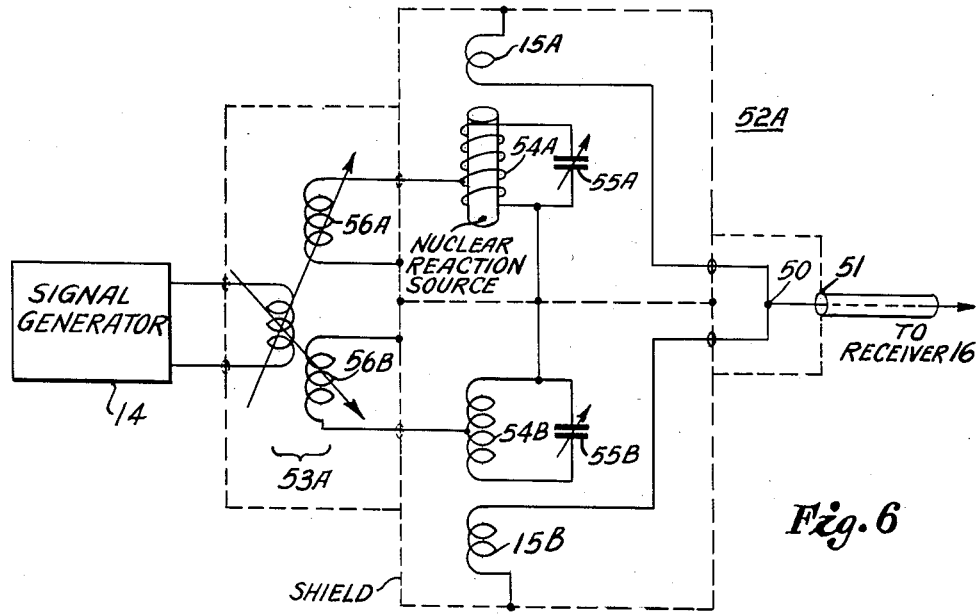

March 18, 1952     W. D. HERSHBERGER     2,589,494
STABILIZING METHOD AND SYSTEM
UTILIZING NUCLEAR PRECESSION
Filed July 20, 1948     3 Sheets-Sheet 1
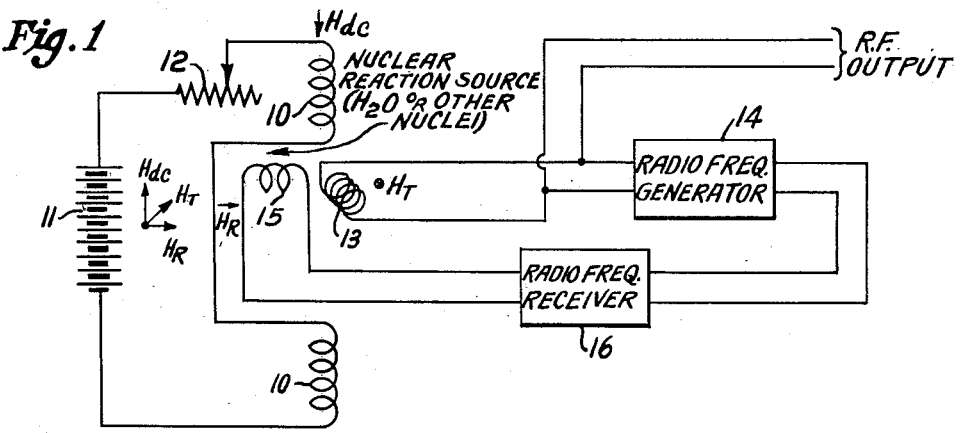
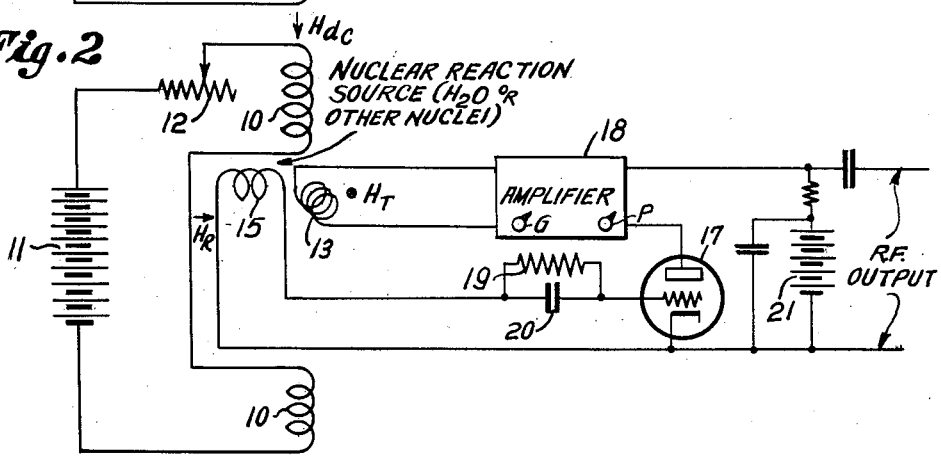
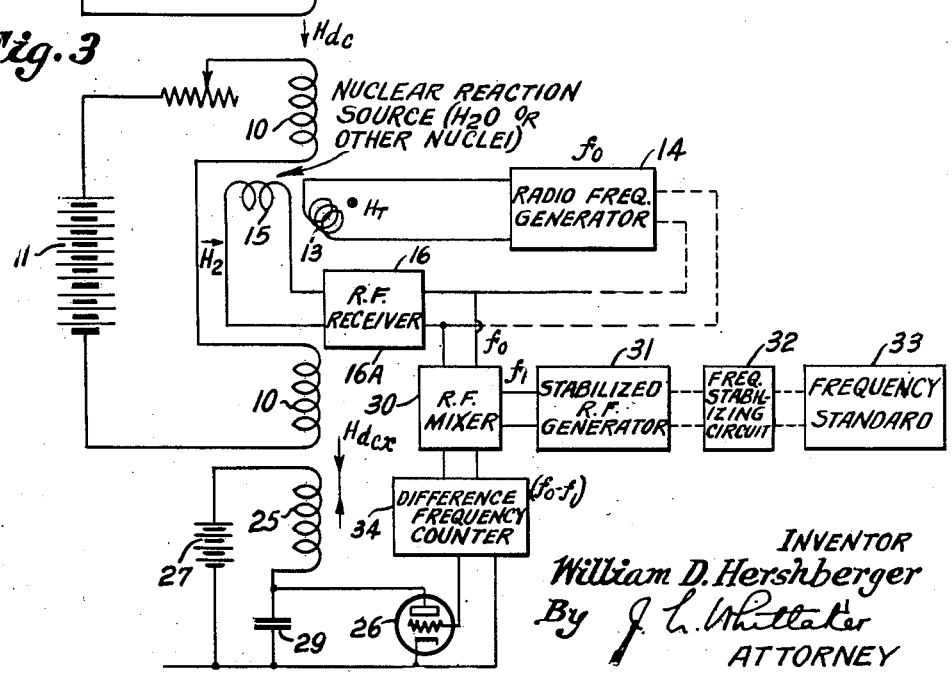
INVENTOR
William D. Hershberger
By J. L. Whittaker
ATTORNEY

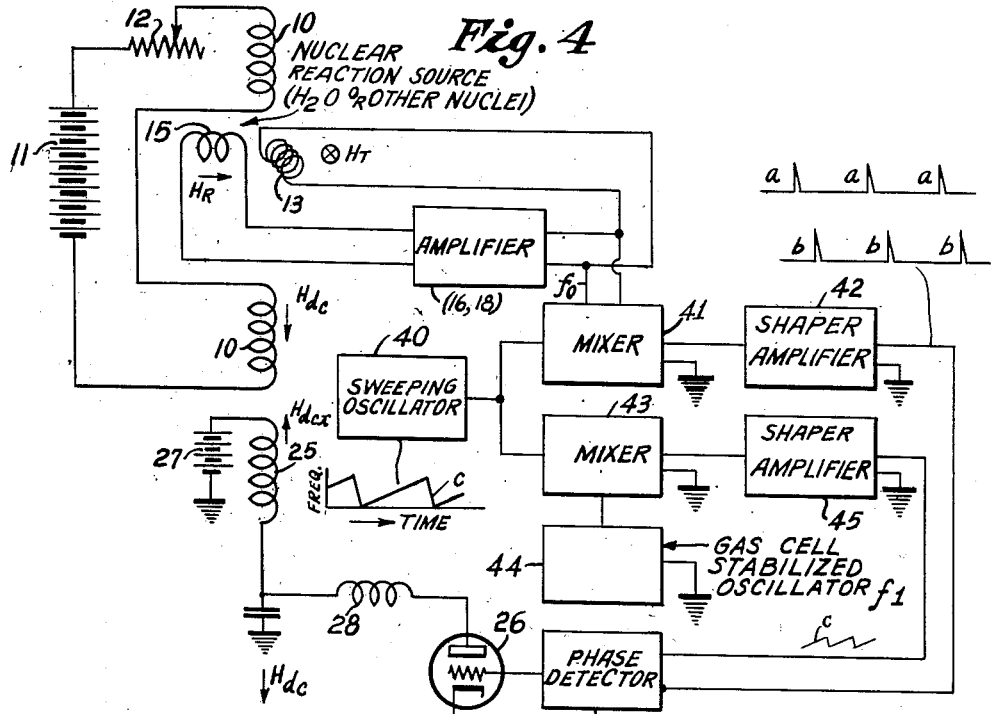
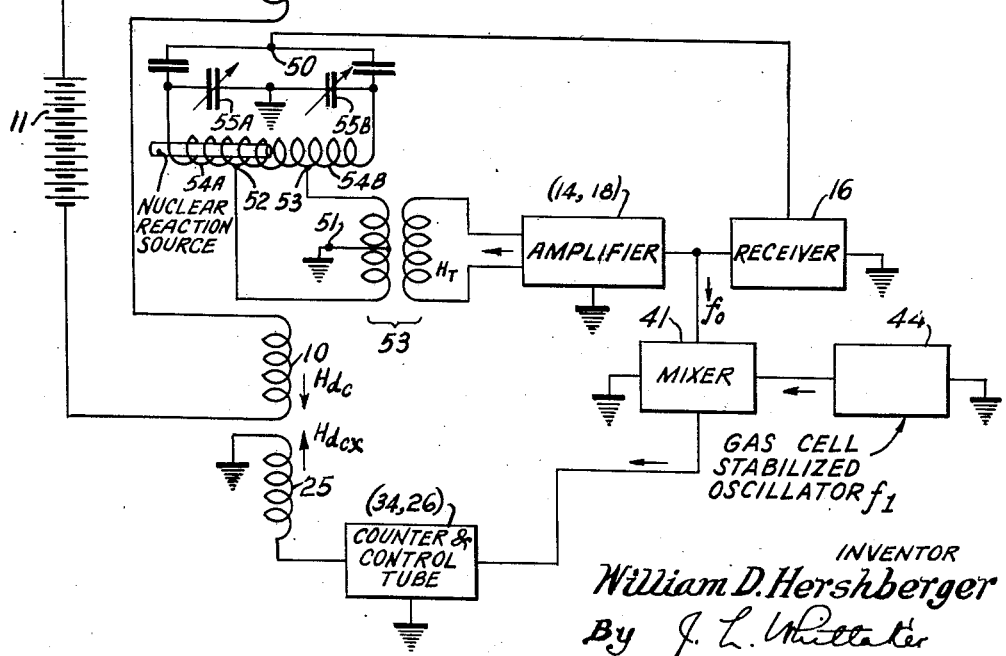

INVENTOR
William D. Hershberger
By J. L. Whittaker
ATTORNEY

Patented Mar. 18, 1952

2,589,494

UNITED STATES PATENT OFFICE 2,589,494

STABILIZING METHOD AND SYSTEM UTILIZING NUCLEAR PRECESSION

William D. Hershberger, Princeton, N. J., assignor to Radio Corporation of America, a corporation of Delaware Application July 20, 1948, Serial No. 39,792

29 Claims. (Cl. 250—36)

This invention relates to methods and systems utilizing nuclear precession for stabilization of magnetic fields.

In accordance with the invention, the intensity of a unidirectional field, or the frequency of an alternating field, may be stabilized by applying both fields to any selected nuclear reaction source and by varying the intensity of the unidirectional field, or the frequency of the alternating field, to maintain nuclear precession which occurs only when the ratio of the intensity of the unidirectional field to the frequency of the alternating field closely corresponds with a constant which is characteristic of the particular selected nucleus.

More specifically, the unidirectional and alternating magnetic fields applied to the nuclear reaction source are produced, in some forms of the invention, by coils which are disposed mutually at right angles to each other and to a third pickup coil effectively magnetically coupled to them only during nuclear precession to provide a signal usable for stabilization: in other forms of the invention, voltage, current, field or other effects of the unidirectional and alternating fields are combined in a bridge circuit whose alternating-current unbalance, occurring upon change in nuclear precession, provides the signal used for stabilization.

In some forms of the invention, the output of receiver apparatus supplied from the above-mentioned tertiary coil is used to control the frequency of a radio-frequency generator which supplies the alternating field coil: in other modifications, the tertiary coil and the alternating field coil are included in the feedback loop of a self-excited oscillator operating at the precession frequency.

In modifications used for stabilization of the unidirectional field, the variations of the difference between the precession frequency and a standard frequency are used to control a variable component of the total unidirectional field; in some modifications, the intensity of the unidirectional field is stabilized by adjusting a variable component thereof to maintain a fixed difference between the frequency of the generator which supplies the alternating field and the frequency of a second generator stabilized by a precision standard, such as a piezo-electric quartz crystal, or a molecular resonance absorption spectral line of a microwave absorptive gas; in other modifications, the variable component of the unidirectional field is adjusted to maintain a constant phase difference between two trains of pulses, one produced by combining the outputs of the tertiary coil and a sweep oscillator and the other train produced by combining the outputs of the sweep oscillator and the stabilized frequency source.

The invention further resides in methods and systems having the features of novelty hereinafter described and claimed.

For a more detailed understanding of the invention and for illustration of various embodiments thereof, reference is made to the accompanying drawings in which:

Figures 1 and 2 are diagrams of frequency-stabilization systems utilizing nuclear precession;

Figures 3 and 4 are diagrams of intensity-stabilization systems using the tri-coil arrangement of Figures 1 and 2; and Figures 5 and 6 are diagrams of intensity-stabilization systems using a bridge instead of the tri-coil arrangement of the preceding figures.

From investigations in nuclear physics, it has been established that the magnetic moment ($\mu$) of a nuclear reaction source may be expressed as $$(1) \qquad \mu = \frac{fhI}{H}$$

where $f$=frequency of precession
$h$=Planck's constant
$I$=spin number
$H$=magnetic field intensity Of the five terms in Equation 1, three of them—the magnetic moment, Planck's constant, and the spin number—are absolutely fixed for any given substance and therefore there is such direct or rigid relationship between the magnetic field intensity and the frequency of precession that either the frequency or the field intensity may be used as a standard for stabilization of the other. Nuclear precession (proton resonance) occurs when and only when the ratio between the intensity of the unidirectional field and the frequency of the alternating field exactly or very closely corresponds with a numerical constant which is characteristic of the nucleus selected as a reaction source. Although the foregoing is applicable to any nucleus which has spin and a magnetic moment, the subsequent discussions will be limited for clarity to protons; i. e., hydrogen nuclei whose spin number is ½, whose nuclear angular momentum is $$\frac{1}{2}\frac{h}{2\pi}$$

and whose magnetic moment is 2.79 nuclear magnetons. (For completeness here, it may be stated that (2) $\quad$ 1 nuclear magneton $= \dfrac{e}{M} \dfrac{h}{4\pi c}$ where $\dfrac{e}{M}$ = ratio of charge to mass of the proton $c$ = speed of light = $3 \times 10^{10}$ cm./second)

Referring to Figure 1 as exemplary of a frequency-control system utilizing nuclear precession, the coils 10 are supplied with direct current from a stabilized source, generically represented by the battery 11 and rheostat 12, to produce a magnetic field $H_{dc}$ which traverses a nuclear reaction source, for example, water, whose nuclei have spin and a magnetic moment. The water may be disposed in a small test-tube, ampule or other non-magnetic container. The coil 13 is supplied with current from a radio-frequency generator 14 to produce an alternating magnetic field $H_T$ at right angles to the unidirectional field $H_{dc}$. The axis of the tertiary pickup coil 15 is at right angles to the axes of both the coils 10 and 13, so that, except for nuclear precession, it is not coupled either to the unidirectional field or to the alternating field. Thus, in effect the axes of coils 10, 13 and 15 define a tri-dimensional coordinate system whose three, mutually-normal planes pass through the nuclear reaction source located at the origin or intersection point of the planes.

The desired operating frequency of generator 14 corresponds with the precession frequency or rate of the particular substance chosen as a nuclear standard at the selected intensity of the unidirectional field $H_{dc}$: conversely stated, for any chosen nuclear standard the unidirectional field intensity is selected or adjusted to effect nuclear precession at the desired operating frequency of generator 14, or at a frequency derived therefrom for the excitation of coil 13. For example, assuming as above, that the chosen standard is the hydrogen nucleus and that the selected intensity of the unidirectional field $H_{dc}$ is 2,000 gauss, the frequency of precession is very close to 9 megacycles. A lithium nucleus, in this same field would have a substantially different but definitely fixed precession frequency. As a reasonably large number of nuclear reaction sources may be selected from and as the strength of the unidirectional field may be selected within a wide continuous range of values, nuclear precession may be effected practically at any desired frequency within a wide band of the frequency spectrum.

At and close to the precession frequency, the pickup coil 15 is effectively coupled to the magnetic fields traversing the nuclear standard and accordingly supplies an input voltage to the radio receiver 16 which, utilizing the well-known discriminator and reactance-tube combination, for example, may be used to stabilize the frequency of the generator 14 so that it may be used as a primary standard of frequency either for test purposes or for excitation of power amplifier stages tuned to the same frequency or to harmonically related frequencies. Under the foregoing conditions, at the precession frequency of 9 megacycles, a signal voltage of the order of 5 millivolts was developed across a receiver coil 15 having a Q of about 80 when the intensity of the A. C. driving field was 5 gauss and of the D. C. field was 2,000 gauss.

Nuclear precession occurs only when the ratio of the intensity of the unidirection field to the frequency of the oscillator field very closely corresponds with a constant which is characteristic of the selected nuclear standard and which remains precisely fixed independently of pressure, temperature and other variables: the conditions under which precession occurs are very critical and for hydrogen nuclei correspond with an equivalent circuit Q of about 70,000. In effect, the oscillator 14 is stabilized to operate on either steep slope of a nuclear (proton) resonance curve affording large frequency-control effects for minute deviations of frequency.

In the system shown in Figure 2, the pickup coil 15 is included in the input circuit of the high-gain amplifier generically represented by tube 17 and block 18. The operating grid-bias of tube 17 may be derived from its rectified grid-current by the resistance-capacitance network 19, 20. The D. C. anode-current supply source is generically represented by battery 21. The coil 13 for supplying the A. C. magnetic field impressed on the nuclear reaction source is included in the output circuit of the amplifier 18 and is so poled or phased there is formed a self-excited oscillator system for generation of oscillations at the precession frequency. Feedback coupling between coils 13, 15 exists only at and very close to the precession frequency. The feedback loop of the oscillator preferably includes gain and phase-controls generically represented by knobs 18G, 18P. In other respects, this modification is similar to that of Figure 1 and need not be further discussed.

In the modification shown in Figure 3, which is for precise stabilization of the intensity of a unidirectional magnetic field, the unidirectional field $H_{dc}$ is in part supplied by the coils 10 energized from a fairly stable or stabilized source 11 and in part supplied by the coil 25 which provides the variable component $H_{dcx}$ of the total unidirectional magnetic field applied to the nuclear standard. The variable field $H_{dcx}$ may oppose or aid the field of coils 10: in either event, the total unidirectional field is the algebraic sum of the fields of coils 10 and 25.

In the particular arrangement shown in Figure 3, the auxiliary field coil 25 is in the anode circuit of a control tube 26 for traverse by the direct-current component of the anode current of the tube as supplied by a direct-current source exemplified by battery 27. The alternating-current component of the anode current is excluded from coil 25 as by a filter or by-pass arrangement represented by the capacitor 29. The excitation for coil 13 which supplies the alternating magnetic field for the nuclear standard may be provided as in Figures 1 and 4 by an oscillator stabilized at the precession frequency or as in Figure 2 by an oscillator including coils 15 and 13 in its feedback loop and therefore operating at precession frequency. In either event, the precession frequency $f_0$ is applied to a mixer or modulator 30 upon which is also impressed the frequency $f_1$, derived from a stabilzed frequency-generator 31. For many purposes, the frequency of generator 31 may be stabilized within satisfactorily close limits by a piezo-electric crystal.

The difference frequency $(f_0 - f_1)$ or $(f_1 - f_0)$ appearing in the output of mixer 30 is applied to a frequency-counter circuit 34 of any suitable type, such for example, as shown in Sanders Patent No. 2,228,367, and the direct-current output of the frequency-counter circuit is supplied variably to bias the grid of the field-control tube 26. Accordingly, as the total intensity of the unidirectional field jointly produced by coils 10 and 25 tends to deviate in either direction from the desired value, the precession frequency $f_0$ correspondingly varies: in consequence, the difference-frequency increases or decreases in corresponding sense to change the grid voltage of the control tube 26 in the proper sense to effect a compensatory change of field $H_{dcx}$.

In brief, resonant frequency of the quartz crystal $f_1$ is used as a standard of reference for the precession frequency and the unidirectional magnetic field $H_{dc}$ is controlled to maintain a constant difference between the quartz crystal frequency and the nuclear resonant frequency of the selected nuclear standard. As the resonant frequency of the quartz crystal is extremely sharp and since the precession frequency of the nuclear reaction source is rigidly related to the intensity of the field applied to it, the regulation of the field intensity in accordance with deviations of the difference between those two frequencies insures a constancy of the magnetic field intensity within narrow limits never heretofore approached and which are not substantially affected by temperature, pressure or other ambient variables.

In the modification shown in Figure 4, which is also for precise stabilization of a unidirectional field, the precession frequency $f_0$ of the nuclear reaction source and the periodically varying frequency of a sweep oscillator 40 are impressed upon a mixer or modulator 41 to produce a beat-frequency applied to a shaper-amplifier 42 which may be of the type shown in copending application Serial No. 4,497, filed January 27, 1948, thus to generate two trains of pulses "a" and "b" whose repetition rate corresponds with the modulating frequency applied to the sweep oscillator 40. The waveform of the sweep or modulating frequency is preferably sawtoothed, as indicated by pulses "c" though it may be of other shape. The repetition rate of the sweep pulses may be low, for example, of the order of 60 pulses per second and in any event low relative to the carrier frequency of oscillator 40. The output of the frequency-modulated oscillator 40 is also impressed upon a second mixer 43 for production of a varying beat-frequency equal to the difference between the modulated frequency of oscillator 40 and a fixed frequency $f_1$ derived from a stable or stabilized oscillator 44 whose frequency-determining standard may be a piezo-electric crystal or a microwave absorptive molecular resonant gas cell. The frequency $f_1$ precisely corresponds with or bears a fixed numerical relation to the precession frequency of the nuclear reaction source at the desired intensity of the magnetic field $H_{dc}$, depending upon the chosen frequency-selective characteristic of the shaper-amplifiers 42 and 45. If, for example, the frequency-selective networks of amplifiers 42, 45 are low-pass filters, the desired frequency difference is zero and the band of frequencies swept by oscillator 40 includes the frequencies $f_0$ and $f_1$.

The output of the second mixer 43 is impressed upon the shaper-amplifier 45, which may be of the type shown in copending application Serial No. 4,497 to generate a sawtooth wave whose repetition frequency corresponds with the modulating frequency applied to the sweep oscillator 40 and which is used as a phase reference. The sawtooth waves from network 45 and the sharp pulses from network 42 are applied to phase detector 46, which may be of the type shown in Wendt Patent No. 2,250,284, to produce a unidirectional bias voltage for the field-control tube 26.

Accordingly, when the intensity of the magnetic field $H_{dc}$ deviates from its desired value, there is a corresponding change in the precession frequency $f_0$ with resultant shift in phase of the pulses $a$, $b$ with respect to the sawtooth impulses $c$. In consequence, the control-grid bias of tube 26 automatically increases or decreases in sense varying the excitation of the auxiliary field coil 25 to restore the total field intensity to the desired proper magnitude.

Instead of using the geometrical tri-coil arrangement of Figures 1 to 4 for stabilization of frequency or magnetic-field intensity by a nuclear reaction source, there may be used the bridge arrangements of Figures 5 and 6. As in the previously described modifications, the nuclear reaction source is disposed in a unidirectional magnetic field $H_{dc}$ (produced by coils 10 for example) and in an alternating magnetic field $H_t$ at right angles or normal to the unidirectional field. The input circuit of receiver 16 for detecting and responding to variations of the nuclear precession signal is connected in one arm of the bridge, Figure 5, between output terminals 50, 51 thereof: the output circuit of the amplifier or oscillator 14, 18 is effectively connected in a conjugate arm of the bridge between terminals 52, 53. In the particular arrangement shown, the output of amplifier or oscillator 14, 18 is coupled to the input arm of the bridge by transformer 53 whose secondary winding is center-tapped for connection to output terminal 51 of the bridge.

With the nuclear reaction source out of the field of both bridge coils 54A, 54B, the bridge is balanced, as by adjustment of one or both of the condensers 55A, 55B at the frequency $f_0$ corresponding with the precession frequency of the reaction source at the desired intensity of field $H_{dc}$. With the bridge so balanced, there is no appreciable coupling between the input circuit of the receiver 16 and the output circuit of the oscillator or amplifier 14, 18. The reaction source is then inserted in one of the bridge coils, as shown, Figure 5, to establish a coupling for generation or stabilization of oscillations at the precession frequency. As in the system of Figure 3, any variation of the difference between the precession frequency $f_0$ and a standard frequency $f_1$ is utilized to control the magnitude of direct-current traversing the auxiliary direct-current field-coil 25. The sense and extent of the variation of current in coil 25 restores the total intensity of the unidirectional field to the desired magnitude.

The arrangement shown in Figure 5, as well as those of preceding figures, may be used for stabilization of the field intensity of electromagnets used in cyclotrons, betatrons, mass spectrometers and the like.

In Figure 6, the bridge network 52A is a variant of the bridge 52 of Figure 5. The primary 57 of transformer 53A is differentially coupled to its secondary windings 56A, 56B which are respectively connected to the tuned circuits 54A, 55A and 54B, 55B isolated from each other as by disposition in different shielded compartments. The bridge is balanced in two operations: for amplitude, by varying the coupling of the primary 57 to the secondary windings 56A and 56B; and for phase, by adjustment of the tuning condensers 55A, 55B or equivalent to tune their respective circuits to exact resonance at the frequency of the signal generator 14 or equivalent. The pickup coils 15A, 15B respectively coupled to the bridge coils 54A, 54B are connected in opposition in the input of receiver 16. Therefore, at balance of bridge 52A, no signal is impressed upon the receiver. After the bridge is so preliminarily balanced, the nuclear reaction source is inserted in a selected one of the coils 54A, 54B so that as in the preceding modifications the reaction source is subjected both to an alternating field and to a relatively strong unidirectional field normal thereto. At and very close to the precession frequency of the reaction source, the reactance and the Q of the directly associated tuned circuit 54A, 55A is markedly changed so unbalancing the bridge and causing a signal to appear in the receiver 16. Also as in the preceding modifications, this unbalance signal may be used for stablization of the unidirectional field or of the frequency of the alternating field.

As pointed out heretofore, the invention is not limited to the choice of the hydrogen-nucleus or proton, but is equally well adapted to the use of many oher nuclei whose moments have been determined. Twenty-six such nuclei are listed in the Reviews of Modern Physics, volume 18, No. 3, page 348, July 1946. For these nuclei, the precession frequency has a value different from that for the proton at a given magnetic field value. A comparison between precession frequencies for two nucleus species in the same magnetic field permits identification of the nuclei and thus chemical analysis by precession frequency determination.

It shall be understood the invention is not limited to the particular arrangements illustrated and described and that changes and modifications may be made within the scope of the appended claims.

I claim as my invention:

1. The method of stabilization which comprises applying a unidirectional field and an alternating field to a nuclear reaction source, and maintaining a constant ratio of the intensity of said unidirectional field to the frequency of said alternating field to effect continuous nuclear precession.

2. The method which comprises applying a unidirectional field and an alternating field to a nuclear reaction source to effect nuclear precession, producing a control effect varying in accordance with the precession frequency, and applying said control effect to maintain constant the ratio of the intensity of said unidirectional field to the frequency of said alternating field.

3. The method of stabilizing the intensity of a unidirectional field which comprises applying said field and a relatively weak alternating field to a nuclear reaction source to effect nuclear precession, producing a control effect varying in accordance with deviation of the precession frequency from a standard frequency, and applying said control effect to regulate the intensity of said unidirectional field.

4. The method of employing nuclear precession in a magnetic field for stabilizing the magnetic field intensity comprising establishing a radio frequency field at the nuclear precession rate for a predetermined field intensity, detecting radio frequency energy coupled through said magnetic field substantially only by nuclear precession, and utilizing said detected energy to stabilize the intensity of said magnetic field.

5. The method of employing nuclear precession in a magnetic field for stabilizing the magnetic field intensity comprising establishing a unidirectional magnetic field, establishing a radio frequency field at the nuclear precession rate for a predetermined field intensity, detecting radio frequency energy coupled through said magnetic field substantially only by nuclear precession, and establishing a compensating unidirectional magnetic field in response to said detected energy to stabilize the intensity of said magnetic field.

6. The method of employing nuclear precession in a magnetic field for stabilizing the magnetic field intensity comprising establishing a unidirectional magnetic field, establishing a radio frequency field normal to said unidirectional field at the nuclear precession rate for a predetermined field intensity, detecting radio frequency energy coupled through said magnetic field substantially only by nuclear precession in a plane normal to the plane of said radio frequency field, and establishing a compensating unidirectional magnetic field in response to said detected energy to stabilize the intensity of said magnetic field.

7. The method of employing nuclear precession in a magnetic field for stabilizing the magnetic field intensity comprising establishing a unidirectional magnetic field, establishing a radio frequency field normal to said unidirectional field at the nuclear precession rate for a predetermined field intensity, detecting radio frequency energy coupled through said magnetic field substantially only by nuclear precession in a plane normal to the plane of said radio frequency field to derive a first signal at the frequency of said radio frequency field, generating a second signal of a different frequency, mixing said signals to provide a difference frequency signal, deriving a control signal characteristic of the frequency of said difference frequency signal, and applying said control signal to stabilize the intensity of said magnetic field.

8. The method according to claim 7 including applying said control signal to establish a compensating unidirectional magnetic field to stabilize the total intensity of said magnetic field.

9. The method of employing nuclear precession in a constant intensity magnetic field for stabilizing the frequency of a radio frequency source at the nuclear precession rate comprising establishing a unidirectional magnetic field, coupling said radio frequency source to said field, detecting radio frequency energy coupled through said field substantially only by nuclear precession, and utilizing said detected energy to stabilize the frequency of said source at the nuclear precession rate.

10. The method of employing nuclear precession in a constant intensity magnetic field for stabilizing the frequency of a radio frequency source at the nuclear precession rate comprising establishing a unidirectional magnetic field, coupling said radio frequency source to said field, detecting radio frequency energy coupled through said field substantially only by nuclear precession in a plane substantially normal to the plane of said coupled energy, and coupling said detected energy to said source to stabilize the frequency of said source at the nuclear precession rate.

11. The method of employing nuclear precession in a constant intensity magnetic field for controlling the generation of radio frequency energy at the nuclear precession rate comprising establishing a unidirectional magnetic field, generating radio frequency energy, coupling said radio frequency energy to said field, deriving radio frequency energy coupled through said field substantially only by nuclear precession, and utilizing said derived energy to stabilize the frequency of said generated energy at the nuclear precession rate.

12. The method of employing nuclear precession in a magnetic field wherein the density of said field is directly related to the frequency of radio frequency energy propagated through said field comprising establishing a unidirectional magnetic field, establishing in said unidirectional magnetic field a radio frequency field at the nuclear precession rate, stabilizing the aforementioned characteristic of one of said fields and controlling the aforementioned characteristic of the other of said fields in response to said field stabilization.

13. A system employing nuclear precession in a magnetic field wherein the density of said field is directly related to the frequency of radio frequency energy propagated through said field comprising means for establishing a unidirectional magnetic field, means for establishing in said unidirectional magnetic field a radio frequency field at the nuclear precession rate, and means for stabilizing the aforementioned characteristic of one of said fields to control the aforementioned characteristic of the other of said fields.

14. Apparatus for employing nuclear precession in a magnetic field for stabilizing the magnetic field intensity comprising means for establishing a radio frequency field at the nuclear precession rate for a predetermined field intensity, means for detecting radio frequency energy coupled through said magnetic field substantially only by nuclear precession, and means for utilizing said detected energy to stabilize the intensity of said magnetic field.

15. Apparatus for employing nuclear precession in a magnetic field for stabilizing the magnetic field intensity comprising means for establishing a radio frequency field at the nuclear precession rate for a predetermined field intensity, means for detecting radio frequency energy coupled through said magnetic field substantially only by nuclear precession in a plane normal to the plane of said established radio frequency field, means for deriving from said detected energy a control signal, and means responsive to said control signal for establishing a compensating unidirectional field to stabilize the intensity of said magnetic field.

16. Apparatus for employing nuclear precession in a magnetic field for stabilizing the magnetic field intensity comprising means for establishing a unidirectional magnetic field, means for establishing a radio frequency field at the nuclear precession rate for a predetermined magnetic field intensity, means for detecting radio frequency energy coupled through said magnetic field substantially only by nuclear precession in a plane normal to the plane of said established radio frequency field, means for deriving from said detected energy first signals of frequency dependent upon said precession rate, means providing second signals of different frequency than said first signals, means for combining said first and second signals to derive difference frequency signals, means responsive to said difference frequency signals for deriving control signals, and means responsive to said control signals for establishing a compensating unidirectional magnetic field to stabilize the total intensity of said magnetic field.

17. Apparatus for employing nuclear precession in a magnetic field for stabilizing the magnetic field intensity comprising means for establishing a unidirectional magnetic field, means for establishing a radio frequency field at the nuclear precession rate for a predetermined magnetic field intensity, means for detecting radio frequency energy coupled through said magnetic field substantially only by nuclear precession in a plane normal to the plane of said established radio frequency field, means for deriving from said detected energy first signals of frequency dependent upon said precession rate, means providing second signals of different frequency than said first signals, means for combining said first and second signals to derive difference frequency signals, frequency counter circuit means responsive to said difference frequency signals for deriving control signals, and means responsive to said control signals for establishing a compensating unidirectional magnetic field to stabilize the total intensity of said magnetic field.

18. Apparatus for employing nuclear precession in a magnetic field for stabilizing the magnetic field intensity comprising means for establishing a unidirectional magnetic field, means for establishing a radio frequency field at the nuclear precession rate for a predetermined magnetic field intensity, means for detecting radio frequency energy coupled through said magnetic field substantially only by nuclear precession in a plane normal to the plane of said established radio frequency field, means for deriving from said detected energy first signals of frequency dependent upon said precession rate, means providing second signals of different frequency than said first signals, means for combining said first and second signals to derive difference frequency signals, frequency counter circuit means responsive to said difference frequency signals for deriving control signals, and thermionic tube means responsive to said control signals and coupled to said magnetic field for establishing a compensating unidirectional magnetic field to stabilize the total intensity of said magnetic field.

19. Apparatus for employing nuclear precession in a magnetic field for stabilizing the magnetic field intensity comprising means for establishing a radio frequency field at the nuclear precession rate for a predetermined magnetic field intensity, means for detecting radio frequency energy coupled through said magnetic field substantially only by nuclear precession and means for establishing a compensating magnetic field in response to said detected energy to stabilize the total intensity of said magnetic field.

20. Apparatus according to claim 19 wherein said radio frequency field establishing means is stabilized in frequency with respect to a molecular resonance absorption spectral line of a microwave absorptive gas.

21. A radio frequency oscillator employing nuclear precession in a substantially constant intensity magnetic field for controlling the frequency of the generated oscillations comprising means for establishing a unidirectional magnetic field, a thermionic amplifier having regeneratively coupled oscillation circuits coupled together through said field substantially only by nuclear precession in said field whereby sustained oscillations are generated at the nuclear precession rate.

22. A generator employing nuclear precession in a constant intensity magnetic field for controlling the frequency of the generated radio frequency energy at the nuclear precession rate comprising means for establishing a unidirectional magnetic field, a radio frequency energy source coupled to said field, means for detecting radio frequency energy coupled through said field substantially only by nuclear precession, and means for coupling said detected energy regeneratively to said source to stabilize the frequency of said source at the nuclear precession rate.

23. A generator employing nuclear precession in a constant intensity magnetic field for controlling the frequency of the generated radio frequency energy at the nuclear precession rate comprising means for establishing a unidirectional magnetic field, an input circuit and an output circuit coupled to said field, said circuits being coupled together through said field substantially only by nuclear precession, and a thermionic amplifier coupled to said circuits for regeneratively coupling said circuits to provide sustained radio frequency oscillations at the nuclear precession rate.

24. The method of employing nuclear precession in a magnetic field for stabilizing the magnetic field intensity comprising establishing a radio frequency field at the nuclear precession rate, establishing other radio frequency energy of slightly different frequency than said rate, detecting radio frequency energy coupled through said field substantially only by nuclear precession, detecting said other energy, modulating both of said detected energies, comparing said modulated detected energy, and utilizing the difference between said compared energies to stabilize the intensity of said magnetic field.

25. Apparatus for employing nuclear precession in a magnetic field for stabilizing the magnetic field intensity comprising means for establishing a unidirectional magnetic field, means for establishing in said magnetic field a radio frequency field at the nuclear precession rate, means for deriving first signals from said radio frequency field due substantially only to coupling therethrough by nuclear precession, a source of timing signals, a first signal mixer network means for applying said first signals and said timing signals to said first network, a source of second radio frequency signals of frequency slightly differing from said first signal frequency, a second signal mixer network, means for applying said second signals and said timing signals to said second network, a phase comparison circuit, means for applying mixed signals from said mixer networks to said phase comparison circuit to derive a control signal of magnitude dependent upon the phase relations of said mixed signals and means for applying said control signal to stabilize the intensity of said unidirectional magnetic field.

26. Apparatus for employing nuclear precession in a magnetic field for stabilizing the magnetic field intensity comprising means for establishing a unidirectional magnetic field, means for establishing in said magnetic field a radio frequency field at the nuclear precession rate, a second source of radio frequency signals of frequency slightly differing from said precession rate, means for sweeping said first radio frequency signals through said precession frequency and through the second radio frequency means for comparing the phase of said frequency swept signals to derive a control signal of magnitude dependent upon said phase relation, and means for applying said control signal to stabilize the intensity of said unidirectional magnetic field.

27. The method of employing nuclear precession in a magnetic field for stabilizing the magnetic field intensity comprising establishing a unidirectional magnetic field, establishing in said magnetic field a radio frequency field at the nuclear precession rate, a balanced network subjected to said fields and arranged to be unbalanced by nuclear precession in one portion thereof due to increase in field intensity above a predetermined value, means for detecting currents due to said unbalancing of said network, means responsive to said detected currents for deriving control currents, and means for applying said control currents to stabilize the intensity of said unidirectional magnetic field.

28. The method of employing nuclear precession in a magnetic field for stabilizing the magnetic field intensity comprising establishing a unidirectional magnetic field, establishing in said magnetic field a radio frequency field at the nuclear precession rate, generating radio frequency signals of frequency slightly differing from said precession rate, sweeping said first radio frequency signals through said precession frequency and through said second radio frequency, comparing the phase of said frequency swept signals to derive a control signal of magnitude dependent upon said phase relation, and applying said control signal to stabilize the intensity of said unidirectional magnetic field.

29. Apparatus for employing nuclear precession in a magnetic field for stabilizing the magnetic field intensity comprising means for establishing a unidirectional magnetic field, means for establishing in said magnetic field a radio frequency field at the nuclear precession rate, a balanced network subjected to said fields and arranged to be unbalanced by nuclear precession in one portion thereof due to increase in field intensity above a predetermined value, means for detecting currents due to said unbalancing of said network, means responsive to said detected currents for deriving control currents, and means for applying said control currents to stabilize the intensity of said unidirectional magnetic field.

WILLIAM D. HERSHBERGER.

No references cited.